(12) United States Patent
Bouldin et al.

(10) Patent No.: US 7,303,160 B2
(45) Date of Patent: Dec. 4, 2007

(54) SYSTEM AND METHOD FOR PROCESSING WASTE ON A CONTINUOUS BASIS

(75) Inventors: Floyd Eugene Bouldin, McMinnville, TN (US); Thomas Edward Cantrell, McMinnville, TN (US)

(73) Assignee: Bouldin Corporation, Morrison, TN (US)

( * ) Notice: Subject to any disclaimer, the term of this patent is extended or adjusted under 35 U.S.C. 154(b) by 79 days.

(21) Appl. No.: 11/027,222

(22) Filed: Dec. 30, 2004

(65) Prior Publication Data

US 2006/0144980 A1    Jul. 6, 2006

(51) Int. Cl.
    *B02C 19/00*   (2006.01)
(52) U.S. Cl. .................. 241/101.2; 100/94; 100/245
(58) Field of Classification Search ................ 100/245, 100/94–98 R, 906; 83/19; 241/101.2
    See application file for complete search history.

(56) References Cited

U.S. PATENT DOCUMENTS

| | | | | |
|---|---|---|---|---|
| 2,362,701 A | * | 11/1944 | Koehring ..................... 29/34 R |
| 2,393,130 A | | 1/1946 | Toulmin, Jr. ................... 219/3 |
| 4,024,168 A | | 5/1977 | Homann et al. .......... 260/412.2 |
| 4,036,124 A | * | 7/1977 | Seiler et al. ............... 100/98 R |
| 4,099,457 A | | 7/1978 | Hyden ......................... 100/42 |
| 4,201,128 A | * | 5/1980 | Whitehead et al. ............ 100/45 |
| 4,557,190 A | | 12/1985 | Vezzani ........................ 100/98 |
| 5,069,044 A | * | 12/1991 | Holum et al. .................. 62/320 |
| 5,347,921 A | * | 9/1994 | Gourdol .................... 100/98 R |
| 5,558,281 A | | 9/1996 | Bouldin et al. |
| 5,772,134 A | | 6/1998 | Bouldin et al. |
| 6,017,475 A | | 1/2000 | Cantrell |
| 6,186,060 B1 | | 2/2001 | Peterson ...................... 100/98 |
| 2004/0041301 A1 | | 3/2004 | Bouldin et al. |
| 2004/0043097 A1 | | 3/2004 | Bouldin et al. |
| 2004/0043098 A1 | | 3/2004 | Bouldin |
| 2004/0043480 A1 | | 3/2004 | Bouldin |
| 2004/0080072 A1 | | 4/2004 | Bouldin et al. |

* cited by examiner

*Primary Examiner*—Mark Rosenbaum
(74) *Attorney, Agent, or Firm*—Waddey & Patterson, P.C.; Phillip E. Walker (57) ABSTRACT

A system for processing waste on a continuous basis comprises an infeed assembly, a vessel held at a non-ambient pressure and/or temperature, and an outfeed assembly. The infeed assembly includes: a sleeve where waste is delivered; a gate construction that moves between an open and a closed position; and a ram that moves within the sleeve to compress waste when the gate construction is in the closed position and to push the compressed waste into the vessel, where it is metamorphically processed, when the gate construction is in the open position. The processed material moves from the vessel to the outfeed assembly, which includes a compaction chamber, a ram that moves within the compaction chamber, and a cutter assembly. Waste is compacted in the compaction chamber by the ram, cut by the cutter assembly, and delivered as a compacted block to an environment having an ambient pressure and/or temperature.

12 Claims, 11 Drawing Sheets

SECTION A-A
FIG. 4A

SECTION A-A
FIG. 4B

SECTION A-A
FIG. 4C

SECTION A-A
FIG. 4D

SECTION A-A
FIG. 4E

SYSTEM AND METHOD FOR PROCESSING WASTE ON A CONTINUOUS BASIS

FIELD OF THE INVENTION

The present invention relates to solid waste disposal, and, more particularly, to a system and method for transforming solid waste into useful products, including a reusable, treatable, or readily degradable material.

BACKGROUND OF THE INVENTION

Solid waste disposal can generally be defined as the disposal of normally solid or semi-solid materials, resulting from human and animal activities, which are useless, unwanted, or hazardous. Solid waste generally comprises: garbage, including decomposable wastes from food; rubbish, including combustible decomposable wastes, such as paper, wood, and cloth, or non-combustible decomposable wastes, such as metal, glass, and ceramics; ashes, including the residue of the combustion of solid fuels; large wastes, including demolition and construction debris and trees; dead animals; sewage treatment solids, including the material retained on sewage-treatment screens, settled solids, and biomass sludge; industrial wastes, including chemicals, paints, and sand; mining wastes, including slag heaps and coal refuse piles; and agricultural wastes, including farm animal manure and crop residues.

Today, the most common method of disposing of solid wastes in the United States is the deposition of such wastes on land or in landfills, which may account for more than ninety percent of the nation's municipal refuse. Incineration accounts for most of the remainder, while recycling and composting of solid wastes accounts for only an insignificant amount.

In modern landfills, refuse is spread in thin layers, each of which is compacted by heavy industrial equipment, such as bulldozers, before the next layer is spread. When about three meters of refuse has been laid down, it is covered by a thin layer of clean earth, which is also compacted. Notwithstanding their widespread use, there are a variety of problems associated with landfills. For example, suitable land must be within economic range of the source of the wastes because, typically, collection and transportation costs account for seventy-five percent of the total cost of solid waste management. Additionally, although pollution of surface and groundwater is believed to be minimized by taking such precautions as: lining and contouring the fill; compacting and planting the cover; selecting proper soil; diverting upland drainage; and placing wastes in sites not subject to flooding or high groundwater levels, such pollution remains a concern. Furthermore, gases are generated in landfills through anaerobic decomposition of organic solid waste. If a significant amount of methane gas is present, it may be explosive; therefore, proper venting and burning of the methane gases are often necessary to eliminate or alleviate these dangerous conditions.

As mentioned, incineration is another solid waste disposal method in use today. Incinerators of conventional design burn waste on moving grates in refractory-lined chambers. The combustible gases and the solids they carry are burned in secondary chambers. In addition to heat, the products of incineration include the normal primary products of combustion, including carbon dioxide and water, as well as oxides of sulfur and nitrogen, gaseous pollutants, and non-gaseous products such as fly ash and unburned solid residue. The incineration process is far from ideal, introducing harmful by-products and pollutants into the atmosphere. Additionally, incineration methods are known to destroy the useful hemicellulose component of woody cellulose materials contained in solid waste.

Because landfill and incineration methods of disposal are known to pose significant environmental problems and concerns for municipalities, government, private industry, and individuals, recycling has become an attractive alternative to these methods. The treatment and handling of solid waste for reuse is particularly attractive. Such treatment and handling of solid waste is referred to herein as resource recovery.

A traditional hydrolyzer is typically used for processing organic material, for example, animal carcasses or parts thereof, including organic wastes generated during meat and poultry production for human consumption. Traditional hydrolyzer apparatuses have various shortcomings. For example, some traditional hydrolyzers are designed to treat only a single batch of organic waste at a time. More specifically, a traditional batch hydrolyzer must be loaded with a batch while at an ambient pressure and temperature. It is then sealed, brought up to and held at an elevated pressure and temperature until the batch has been processed. Next, it is brought back down to ambient pressure and temperature, unsealed, and the processed batch of is removed. Such hydrolyzers can also become clogged while the batch is being processed, creating additional problems. Specifically, pressure and heat are slowly transferred to the batch after it is placed in the traditional batch hydrolyzer, creating a tendency for the organic waste to congeal and develop a clumpy or gummy consistency. Waste having a clumpy or gummy consistency requires a greater amount of time to process. Although certain mixing mechanisms provided within the traditional hydrolyzer can reduce this problem, there remains a risk of repeated and continuous clogging. At times, such clogging must be remedied by bringing the pressure and temperature down to ambient, unsealing the hydrolyzer, manually unclogging the hydrolyzer, resealing the hydrolyzer, bringing the hydrolyzer back to elevated pressure and temperature, and allowing the processing of the batch to continue.

Other traditional hydrolyzers are designed to handle a low-level flow of organic waste rather than merely a single batch at a time; however, these traditional flow hydrolyzers are also rife with problems. A traditional flow hydrolyzer is an open system in which organic waste travels from an inlet, through a vessel having somewhat of an elevated pressure and temperature, and to an outlet. In an attempt to retain pressure and temperature within the vessel, the inlet and outlet openings are relatively small, limiting the amount of organic waste that can be transferred into and out of the hydrolyzer. Additionally, because the system is open, it is difficult to reach pressures above about 50 psi, which results in slower processing. Indeed, because the system is open, pressure and heat must be continuously pumped into the vessel to even maintain pressures of about 50 psi. The open system also creates a risk of a forceful or violent ejection of material from the area of elevated pressure through the inlet or outlet.

Additionally, because material must flow through such traditional hydrolyzers, they must be equipped with a system for shuttling material through the vessel from the inlet to the outlet. Such systems may include a rotating spindle with attached paddles for pushing the material through the vessel. However, as with the batch hydrolyzers, there is a certain tendency for the organic waste to congeal as it enters the vessel, and it may clump around the paddles, clogging the vessel. The above-mentioned problems are just of few of those making treatment of waste using either a traditional batch hydrolyzer or a traditional flow hydrolyzer inefficient and time intensive.

Existing waste disposal systems have a variety of problems. Chief among them is that the use of landfills and incinerators ignore the useful components of solid waste and pose significant environmental problems. Also, existing apparatuses for the recovery of subsets of solid waste, such as organic wastes, are inefficient in that they must be shut down for significant periods of time when becoming clogged with debris.

Accordingly, there remains a need in the art for apparatuses and methods of resource recovery which do not pose environmental problems and are efficient.

SUMMARY OF THE INVENTION

The present invention meets the above-identified needs, and others, by providing an efficient system and method for transforming solid waste into useful or readily degradable material.

An exemplary system, made in accordance with the present invention includes: an infeed assembly, which may be used to continuously transfer waste from an environment having an ambient pressure and/or temperature to an environment having an elevated pressure and/or temperature; a metamorphic processing apparatus (MPA), which makes use of elevated pressure and/or temperature to assist in processing solid waste; and an outfeed assembly, which may be used to continuously transfer the useful product from an environment having an elevated pressure and/or temperature to an environment having an ambient pressure and/or temperature. The infeed assembly, MPA and outfeed assembly may be used separately or may be used together as a system for metamorphically processing solid waste on a continuous basis to create a useful material or readily degradable material.

One exemplary embodiment of the infeed assembly comprises: an inlet chute, for receiving waste; a pipe sleeve, held at an ambient pressure and/or temperature and containing a ram for compacting waste after it falls from the inlet chute into the pipe sleeve; a sliding gate construction, having a gate plate that may be moved between an open position and a closed position; and a chamber, which is held at an elevated pressure and/or temperature and is operationally disconnected from the pipe sleeve when the gate plate is in the closed position.

The ram for compacting waste after it falls into the pipe sleeve is manipulated back and forth within the pipe sleeve by a first hydraulic cylinder, which moves the ram between three distinct positions: a first position wherein the ram is fully extended blocking the flow of waste from the inlet chute to the pipe sleeve; a second position wherein the ram is fully withdrawn and flow of waste from the inlet chute to the pipe sleeve is allowed; and a third position wherein the ram is partially extended, but the flow of waste from the inlet chute to the pipe sleeve is blocked.

The sliding gate construction includes the gate plate, which is flanked by end plates that are secured to the pipe sleeve. The gate plate is operably connected to a second hydraulic cylinder, which moves the gate plate between the open position and the closed position. When the gate plate is in a closed position, the interior of the pipe sleeve is operationally disconnected from the chamber. However, when the gate plate is in an open position, flow of waste from the pipe sleeve to the chamber is permitted.

As mentioned above, the chamber is held at an elevated temperature and/or pressure. The chamber is surrounded by a heated casing for supplying heat to and providing insulation for the chamber. The casing may be heated, for example, using steam, which may be delivered to a space defined between the chamber and the casing. The chamber may be operationally connected to and may receive pressure from a vessel held at an elevated pressure, such as, for example, the metamorphic processing apparatus (MPA), which will be described below.

This embodiment of the infeed assembly thus operates in the following manner. The ram begins in the fully extended first position wherein the gate plate is in a closed position, and waste is introduced into the inlet chute. The ram is then placed in the fully retracted second position and the waste is permitted to flow from the inlet chute into the pipe sleeve, where it combines with any waste that has previously been introduced into the pipe sleeve. The ram is then placed in the partially extended third position, blocking the flow of waste into the pipe sleeve and combining with any previously introduced waste to form a plug. The gate plate remains in the closed position, allowing the plug to be uniformly compressed.

Following compression of the plug, the gate plate is raised, allowing for access to the chamber. Because the plug is compressed, as well as contained by the ram, it blocks the release of pressure and/or heat from the chamber and protects against the forceful ejection of the waste from the infeed assembly upon exposure to the elevated pressure. Next, the ram is moved into the fully extended first position, forcefully inserting the plug into the chamber. Finally, the gate plate is returned to the closed position, and the operation is repeated as desired.

In this manner, the waste may continuously flow from the portion of the infeed assembly having an ambient pressure and/or temperature to an environment having an elevated pressure and/or temperature. This continuous flow may be achieved while maintaining the elevated pressure and/or temperature within the chamber and without causing the waste to be ejected from the infeed assembly upon exposure to the elevated pressure. In this regard, the infeed assembly may be used as part of a system wherein the chamber may be operationally connected to and continuously feed waste to a distinct vessel held at an elevated pressure and/or temperature, such as, for example, the above mentioned metamorphic processing apparatus (MPA). When the infeed assembly is being used as part of such a system, the pre-exposure to elevated pressure and/or temperature in the chamber allows the waste to quickly reach an elevated pressure and temperature before being delivered to the distinct vessel, thereby inhibiting its tendency to congeal upon entering the distinct vessel.

The metamorphic processing apparatus (MPA) metamorphically processes waste in that it effects a change of physical form, structure, or substance to the components of the waste. One exemplary embodiment of the MPA comprises an inlet for receiving waste; a processing vessel; and an outlet. The pressure and/or temperature within the processing vessel is elevated and may be controlled using a control assembly which uses, for example, steam to deliver pressure and heat in a manner understood by those skilled in the art.

The processing vessel contains a rotating spiked auger, i.e., an axle with a plurality of outwardly extending spikes. The spikes are secured to the axle such that the placement of adjacent individual spikes form a helical pattern along the length of the axle. This helical pattern facilitates the movement of waste from the inlet to outlet of the MPA, while preventing clogging and promoting self-cleaning. Specifically, the spikes of the rotating auger urge the material in the vessel towards the outlet in an action having the ability to completely empty the vessel.

One exemplary embodiment of the outfeed assembly comprises an inlet; a compaction chamber, which may be held at an elevated pressure and/or temperature; a plunger assembly; a containment assembly; and a cutter assembly. The outfeed assembly receives the processed product, for example, from an operationally connected vessel held at an elevated pressure and/or temperature, such as the MPA. The received product falls through the inlet and into the compaction chamber, where it is compressed by a ram of the plunger assembly. The ram is situated and cycles within the compaction chamber to compress the product. The force of the ram on the waste is sufficient to produce a compressed block within a volume defined by the compaction chamber.

The containment assembly includes a containment cylinder, which is attached at one end to a stop plate. The stop plate serves as a backstop for the ram of the plunger assembly, enabling the product interpositioned between the ram and the stop plate to form a compressed block.

The block cutter assembly includes a block forming section and a knife. The knife includes an aperture configured to be aligned with the compaction chamber such that the block may pass through the aperture into the block forming section before being cut by the knife.

This embodiment of the outfeed assembly is operated in the following manner. The ram is extended to a position which prevents the flow of product from the inlet into the compaction chamber and the stop plate is positioned adjacent the compaction chamber at the opening to the block forming section. Next, the ram is withdrawn to allow product to fall into the compaction chamber. The ram is then extended to compress product against the stop plate. Because the plunger assembly exerts more force than the containment cylinder, the cylinder begins to be overridden by the block of product pushing against the stop plate, such that the stop plate is forced to retreat slightly into the block forming section. The ram continues to be withdrawn, allowing additional product to be introduced into the compaction chamber, and thereafter extended, forcing the newly added product against the block. The force of the ram against the block continues to push the stop plate further into the block forming section until the capacity of the block forming section is met, that is, the stop plate has fully retreated into the block forming section and the cylinder has been completely overridden.

The block cutting assembly is used to cut a portion of the block held within the block forming section, leaving a portion of the block within the chamber. The cylinder of the block cutting assembly operates to extend the knife and cut the block. As the knife extends to cut the block, the block cutting assembly moves from a position where the aperture is aligned with the chamber, to a position where the aperture is not aligned with the chamber. The outfeed assembly may additionally comprise a material exit apparatus, an embodiment of which includes an ejection tube, to which the aperture becomes aligned; an expansion chamber; an exit channel; and an outlet. The cylinder may operate to extend the stop plate, forcing the freshly cut block from the block forming section, into the ejection tube and associated expansion chamber. The block forming section of the block cutting assembly is then realigned with the chamber ready to cooperatively execute the above-described operation.

In this manner, the product may continuously flow from the portion of the outfeed assembly having an elevated pressure and/or temperature to an environment having an ambient pressure and/or temperature. This continuous flow may be achieved while maintaining the elevated pressure and/or temperature within the compaction chamber and without causing the waste to be ejected from the outfeed assembly upon exposure to the ambient pressure. In this regard, the outfeed assembly may be used as part of a system wherein the compaction chamber may be operationally connected to and continuously accept waste from a distinct vessel held at an elevated pressure and/or temperature, such as, for example, the metamorphic processing apparatus (MPA).

When the freshly cut block is forced from the block forming section, into the ejection tube and associated expansion chamber of the material exit apparatus, it falls into the exit channel. Contained within the exit channel is a rotating auger having a helical pattern for breaking up the block and delivering it to the outlet. Upon leaving the material exit apparatus, the processed product may be used for various applications, or may be subjected to further treatments before being used.

DETAILED DESCRIPTION OF THE INVENTION

Figure 1:
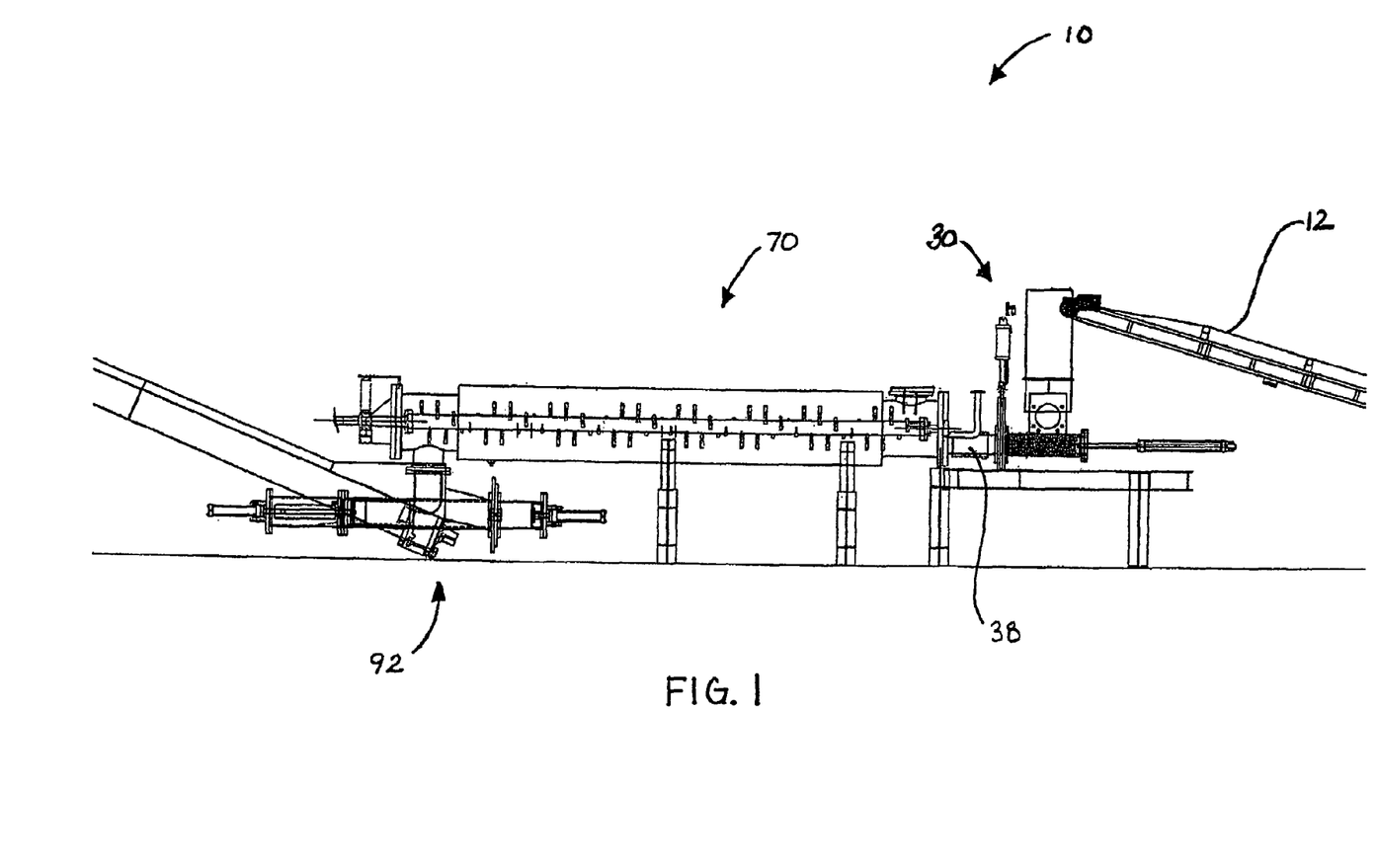
FIG. 1 is a side view of side view of an embodiment of the metamorphic processing apparatus (MPA) of the present invention connected to an embodiment of the infeed assembly of the present invention and an embodiment of the outfeed assembly of the present invention.

The present invention is a system and method for transforming solid waste into useful material. With reference to FIG. 1, an exemplary system 10 for processing solid waste on a continuous basis generally comprises the following: an infeed assembly 30, which may be used to continuously transfer waste from an environment having an ambient pressure and/or temperature to an environment having an elevated pressure and/or temperature; a metamorphic processing apparatus (MPA) 70, which makes use of elevated pressure and/or temperature to assist in processing waste; and an outfeed assembly 92, which may be used to continuously transfer product from an environment having an elevated pressure and/or temperature to an environment having an ambient pressure and/or temperature. Furthermore, it should be understood that these discrete components of the exemplary system, the infeed assembly, the MPA, and the outfeed assembly, may also be used separately to process material without departing from the spirit and scope of the present invention. In the following description, the term, waste, is generally used to describe the material being transformed by the system and method of the present invention before it has been subjected to metamorphic processing, while the term, product, is generally used to describe the material after it has been subjected to metamorphic processing.

An exemplary embodiment of the infeed assembly 30 will first be described. Waste may be carried to the infeed assembly 30, for example, via a conveyor 12, as depicted in FIG. 1, which waste may have been preprocessed, by way of example and not limitation, by reducing its particle size using an apparatus comprising grinders or shredders and/or removing metal using an apparatus comprising magnetic separators. In any event, with reference to FIGS. 2 and 3, the infeed assembly 30 receives waste via an inlet chute 32 leading to a pipe sleeve 34.

Figure 2:
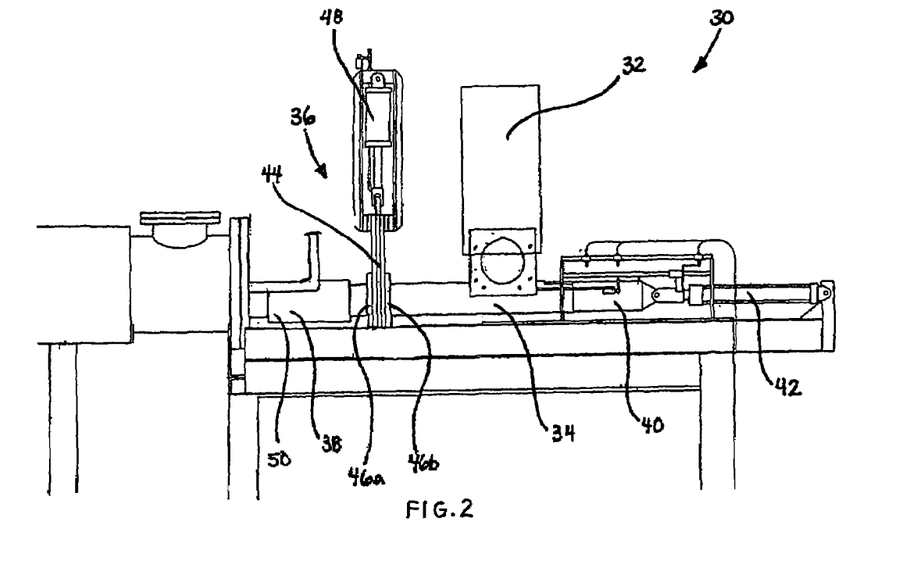
FIG. 2 is an enlarged side view of the infeed assembly of FIG. 1, shown connected to the MPA.
Figure 3:
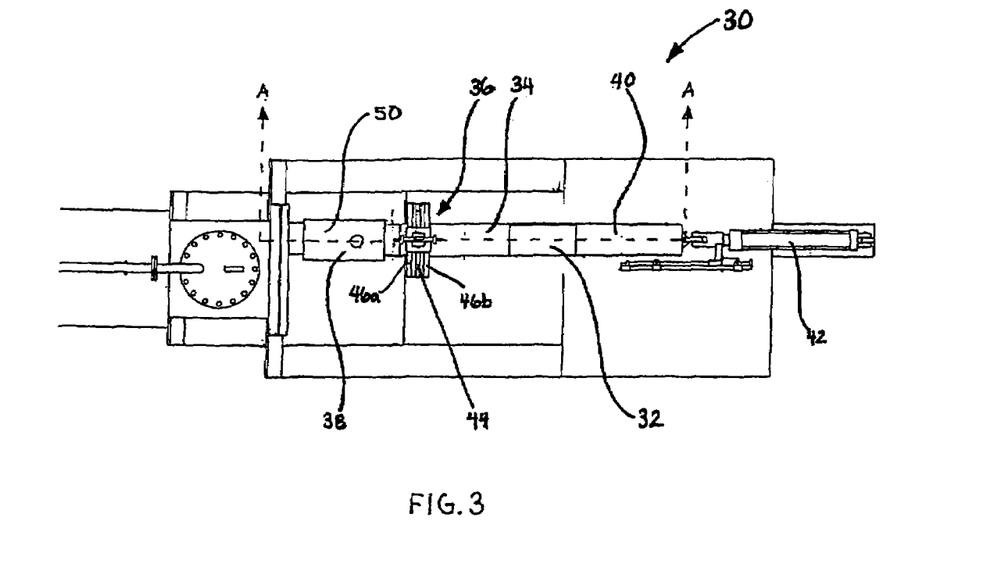
FIG. 3 is a top view of the infeed assembly of FIG. 2.

The illustrated infeed assembly 30 comprises: the inlet chute 32; the pipe sleeve 34, containing a ram 40 operably connected to a first hydraulic cylinder 42 for moving the ram 40 back-and-forth within the sleeve 34; a sliding gate construction 36, which includes a gate plate 44 flanked by a pair of end plates 46a, 46b and is operably connected to a second hydraulic cylinder 48 for moving the gate plate 44 between an open position and a closed position; and a chamber 38, which is surrounded by a heated casing 50.

Figure 4A:
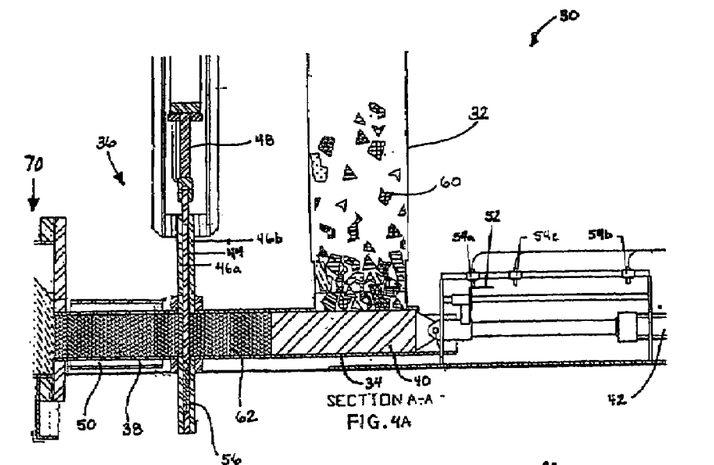
FIGS. 4A through 4E are various operational views of the infeed assembly of FIGS. 2 and 3, as seen from longitudinal cross-section line A-A of FIG. 3.
Figure 4B:
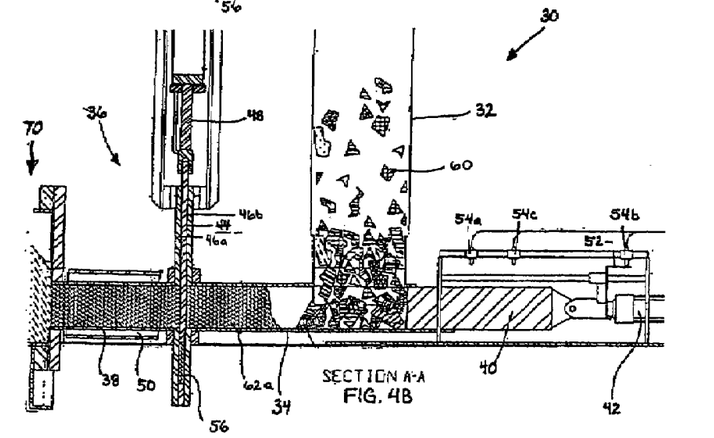

With reference to FIG. 4B, the inlet chute 32 is adapted for receiving waste 60, which typically falls from the inlet chute 32, into the pipe sleeve 34 for processing. In this regard, it is contemplated that the inlet chute 32 may include a static or vibrating grate capable of prohibiting large objects from falling into the pipe sleeve 34, while allowing all other waste to fall into the pipe sleeve 34. As mentioned above, the ram 40 is manipulated back and forth within the pipe sleeve 34 by the first hydraulic cylinder 42. In this exemplary embodiment, the first hydraulic cylinder 42 moves the ram 40 into three positions, which may be described with reference to the contact made between a tenon 52, associated with the cylinder 42, and proximity switches 54a, 54b, and 54c.

Figure 4C:
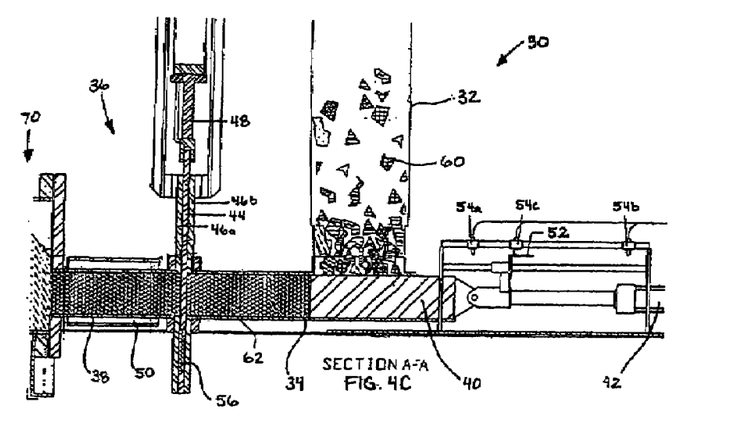

A first position, best shown in FIG. 4A wherein the ram 40 is fully extended, is achieved when the tenon 52 contacts a first proximity switch 54a. A second position, best shown in FIG. 4B wherein the ram 40 is fully withdrawn, is achieved when the tenon 52 contacts a second proximity switch 54b. A third position, best shown in FIG. 4C, is achieved when the tenon 52 contacts a third proximity switch 54c. When the tenon 52 contacts one of the switches 54a, 54b, 54c, a control signal is transmitted to the sliding gate construction 36, allowing movement of the gate plate 44 to be coordinated with the position of the ram 40.

Figure 4D:
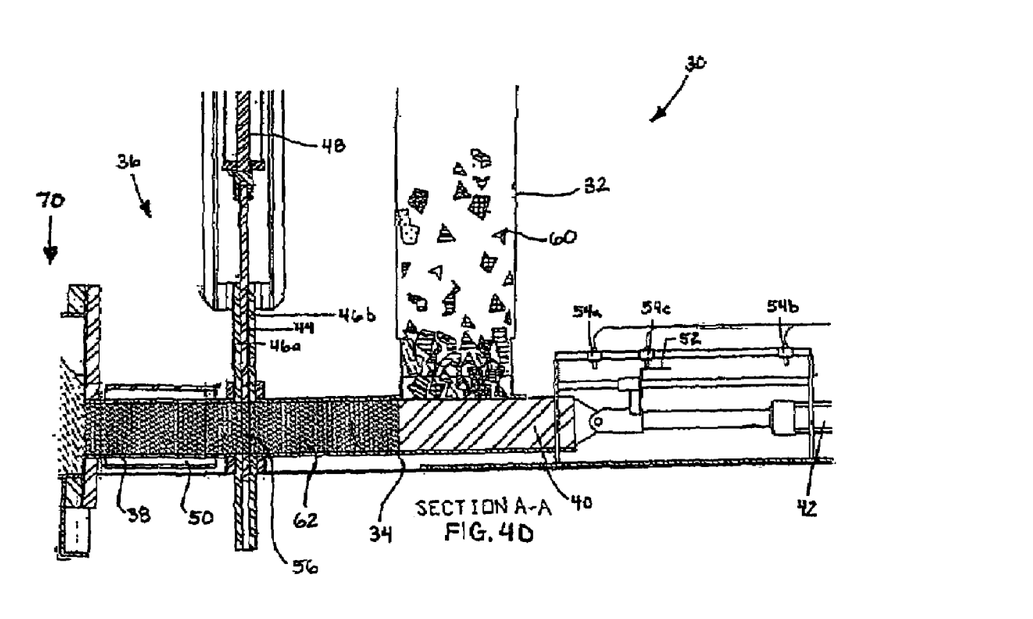
Figure 4E:
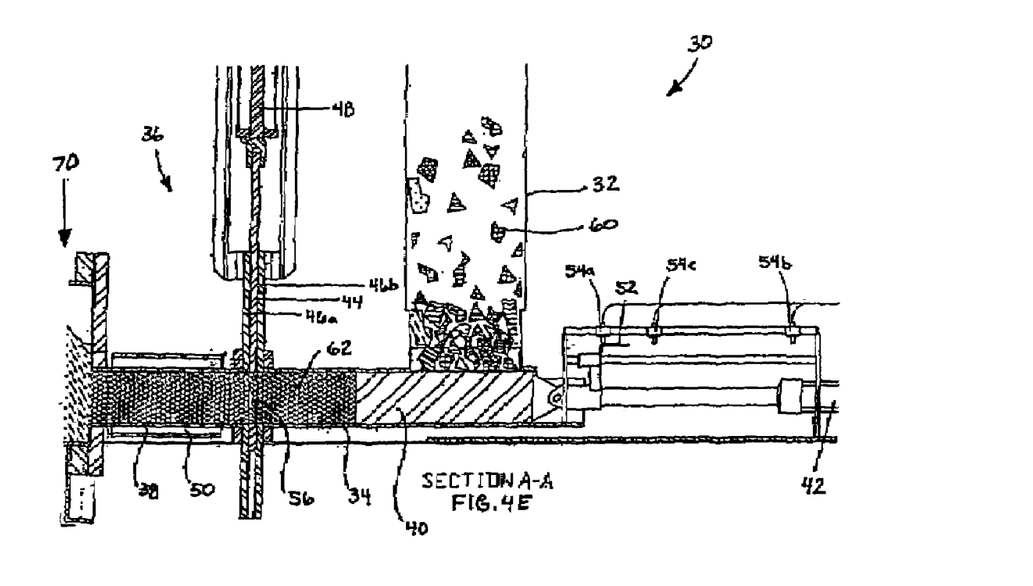

Turning now to the sliding gate construction 36, as mentioned above, the gate plate 44 is flanked by end plates 46a, 46b, which are secured to the pipe sleeve 34, and is operably connected to the second hydraulic cylinder 48, which moves the gate plate 44 between an open position and a closed position. When the gate plate 44 is in a closed position, as shown in FIGS. 4A through 4C, the interior of the pipe sleeve 34 is operationally disconnected from the chamber 38. However, when the gate plate 44 is in an open position, as shown in FIGS. 4D and 4E, an aperture 56 within gate plate 44 is aligned with the pipe sleeve 34, placing the sleeve 34 and the chamber 38 in fluid communication.

The chamber 38 is held at an elevated temperature and/or pressure. The chamber 38 is surrounded by the heated casing 50, which supplies heat to and provides insulation for the chamber 38. The casing 50 may be heated, for example, using steam, which may be delivered to a space defined between the chamber 38 and the casing 50. The depicted chamber 38 is operationally connected to and receives pressure from the metamorphic processing apparatus (MPA) 70, which will be described below.

The manner in which the illustrated infeed assembly 30 may operate will now be discussed in detail with reference to FIGS. 4A through 4E. Referring to FIG. 4A, the ram 40 is in the fully extended first position, wherein the tenon 52 is in contact with proximity switch 54a, the gate plate 44 is in a closed position, and waste 60 is introduced into the inlet chute 32. Waste which has previously been fed through the inlet chute 32 and is being held within the pipe sleeve 34 is referred herein as a plug and is generally designated by reference numeral 62. The plug 62 is referred herein as a partial plug 62a when, as shown in FIG. 4B, it does not completely fill the space within the pipe sleeve 34 defined by the gate plate 44 and the ram 40.

Referring now to FIG. 4B, the ram 40 is shown fully in the retracted second position, with the tenon 52 in contact with the proximity switch 54b. In this position, the waste 60 is permitted to flow from the inlet chute 32 into the pipe sleeve 34 together with the partial plug 62a. Turning now to FIG. 4C, the ram 40 is shown in a partially extended position, with the tenon 52 in contact with the proximity switch 54c. When moved into the partially extended position, the ram 40 blocks the flow of waste 60 into the pipe sleeve 34 and forms a complete plug 62 with the newly introduced waste. The gate plate 44 remains in the closed position, allowing the plug 62 to be uniformly compressed.

Referring now to FIG. 4D, following compression of the plug 62 the gate plate 44 is raised, allowing for access to the chamber 38. Because the plug 62 is compressed, as well as contained by the ram 40, it blocks the release of pressure and/or heat from the chamber 38 and protects against the forceful ejection of the waste 60 from the infeed assembly 30 upon exposure to the elevated pressure.

Finally, as shown in FIG. 4E, the ram 40 is moved into the fully extended first position, forcefully inserting the plug 62 into the chamber 38. Referring back to FIG. 4A, the gate plate 44 is returned to the closed position, and the operation is repeated as desired. In this manner, the waste 60, once compressed into the plug 62, may continuously flow from the portion of the infeed assembly 30 having an ambient pressure and/or temperature to an environment having an elevated pressure and/or temperature.

This continuous flow may be achieved while maintaining the elevated pressure and/or temperature within the chamber 38 and without causing the waste 60 to be ejected from the infeed assembly 30 upon exposure to the elevated pressure. In this regard, this exemplary embodiment of the infeed assembly 30 may be used as part of a system for metamorphically processing waste, which does not require the pressure and/or temperature to be lowered to ambient before infeeding a new batch of waste for processing. That is to say, the chamber 38 may be operationally connected to the metamorphic processing apparatus (MPA) 70 such that the infeed assembly 30 may be used to continuously transfer waste into the MPA 70 for metamorphic processing. Of course, the infeed assembly 30 of the present invention need not be used with the MPA 70 described. Indeed, the infeed assembly 30 may be used with a traditional hydrolyzer, a vessel held at elevated pressures and/or temperatures, or various processing apparatus, without departing from the spirit and scope of the present invention.

When the infeed assembly 30 is being used as part of a system in which the chamber 38 is operationally connected to the MPA 70, as depicted, the exposure to elevated pressure and/or temperature in the chamber 38 prepares the waste for effective processing once it enters the MPA 70. That is to say, when waste is delivered directly to the MPA 70, a vessel having a relatively large volume, as the elevated pressure and/or heat within the MPA 70 begins to transfer to the waste, the waste has a tendency to congeal, developing a clumpy or gummy consistency, which is difficult to process and move through the MPA 70. By way of example and with reference to FIG. 1, the illustrated chamber 38 has diameter and volume which is smaller than that of the MPA 70. As such, pre-exposure to elevated pressure and/or heat within the chamber 38 allows the waste to quickly reach an elevated pressure and temperature before being delivered to the MPA 70, which pre-exposure inhibits congealing of the waste upon introduction into the MPA 70.

Figure 5A:
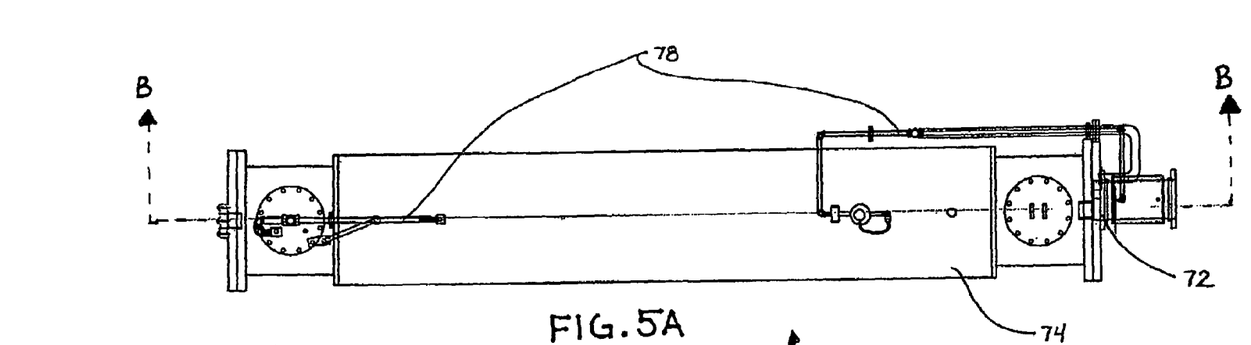
FIG. 5A is a top view of the MPA of FIG. 1 additionally illustrating a control assembly for manipulating temperature and/or pressure and shown connected to the chamber of the infeed assembly.
Figure 5B:
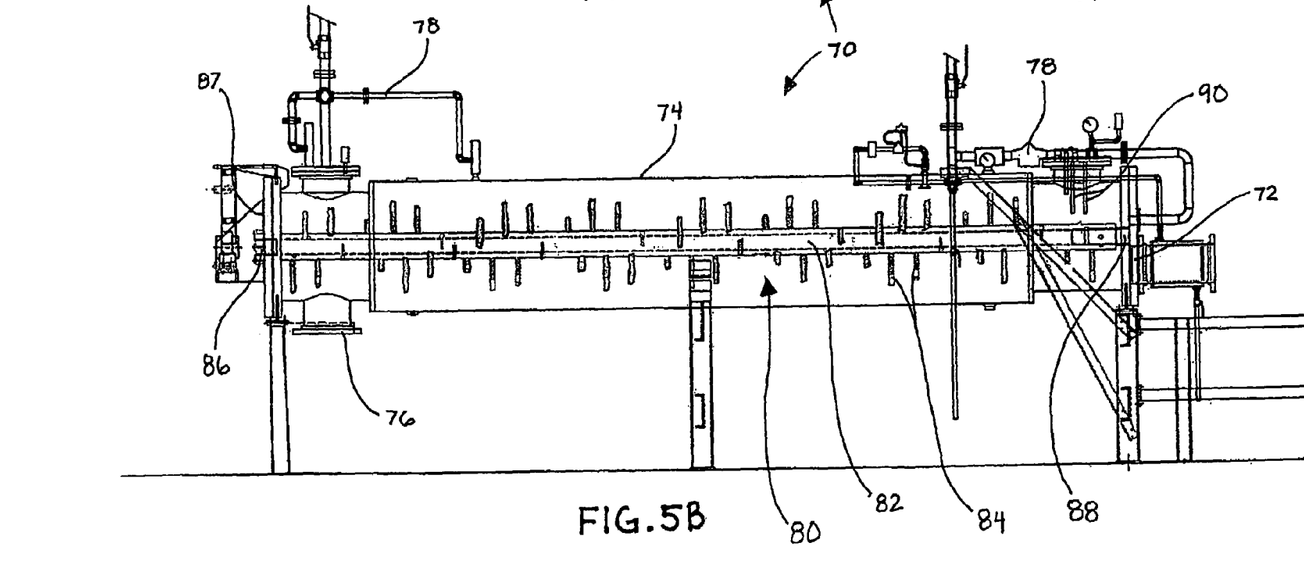
FIG. 5B is a cross sectional side view of the MPA of FIG. 5A, as seen from longitudinal cross-section line B-B of FIG. 5A.

Turning now FIGS. 5A through 6B, one exemplary embodiment of the metamorphic processing apparatus (MPA) 70 of the present invention will now be described. With reference to FIGS. 5A and 5B, the MPA 70 metamorphically processes waste, that is to say, that it effects a change of physical form, structure, or substance to the components of the waste. The illustrated MPA 70 comprises an inlet 72 for receiving waste; a processing vessel 74; and an outlet 76. By way of a single example and not limitation, the pressure and temperature within the processing vessel 74 may be from about 85 psi to about 140 psi and about 200° F. to about 400° F. for processing waste. It will be understood that this example is but one set of compatible ranges, and additional operating temperature and pressure ranges are contemplated. Pressure and temperature within the vessel 74 may be controlled using a control assembly 78 which uses steam to deliver pressure and heat in a manner understood by those skilled in the art.

In this exemplary embodiment, the processing vessel 74 contains a rotating spiked auger 80, i.e., an axle or shaft 82, which is rotated by a drive motor (not shown), and a plurality of spikes 84 extending outwardly from the axle 82. The axle 82 is supported at one end by a thrust bearing 86, which, when the MPA 70 is used with the infeed assembly 30, keeps the auger 80 from succumbing to the forces of the ram 40 as it forces waste into the MPA 70. In other words, the trust bearing 86 absorbs the force transferred from the ram 40 (shown in FIGS. 2 through 4E) to the auger 80, thus protecting against the auger 80 being pushed through the back wall 87 of the MPA 70. The axle 82 is supported at the other end by an internal bushing 88, which receives lubrication from the material being processed within the MPA 70, unlike an external bushing, which requires application of an independent lubricant.

Figure 6A:
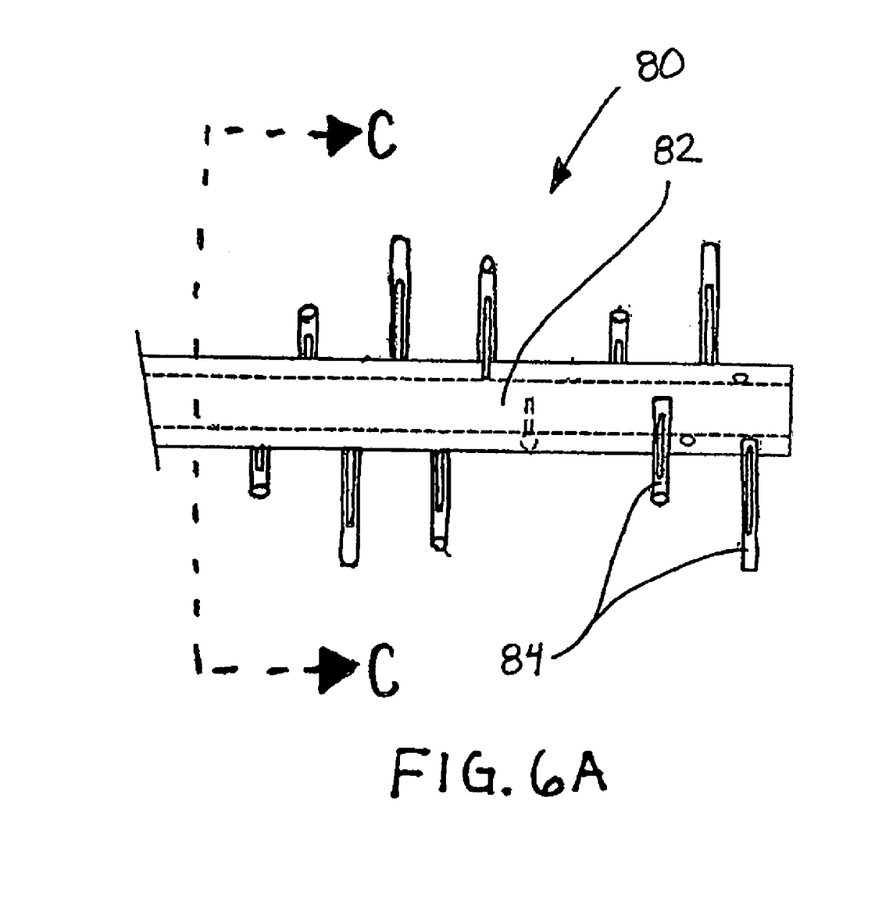
FIG. 6A is an enlarged side view of a portion of the spiked auger of the MPA of FIG. 5A.
Figure 6B:
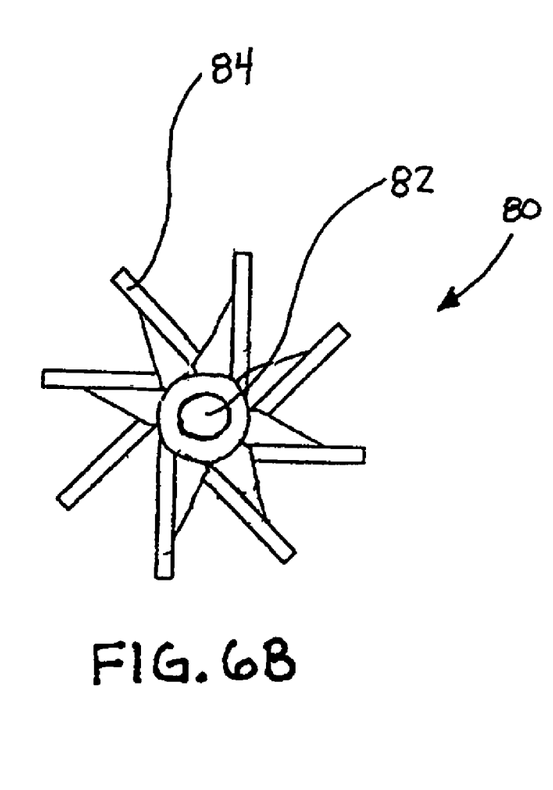
FIG. 6B shows the spiked auger of FIG. 6A, as seen from the transverse cross-section line C-C of FIG. 6A.

The spikes 84 of the auger 80 are integral with or otherwise secured to the axle 82 by well-known methods, such as welding or fasteners. As shown in FIGS. 6A and 6B, the spikes 84 are secured to the axle 82 such that the placement of adjacent individual spikes 84 form a helical pattern along the length of the axle 82. This helical pattern facilitates the movement of material from the inlet 72 to outlet 76 of the MPA 70, while preventing clogging and promoting self-cleaning. That is to say, as the auger 80 rotates, the spikes 84 urge the material in the vessel 74 towards the outlet 76 in an action having the ability to completely empty the vessel 74, if desired. The exemplary MPA 70 additionally includes a pair of bars 90, best shown in FIG. 5B, extending downwardly into the vessel 74 to assist in breaking any clumps in the material received by the MPA 70, thus allowing the spikes 84 of the auger 80 to more easily urge the material through the vessel 74. The bars 90 are positioned and/or designed such that they do not impede the rotation of the auger 80. Although the illustrated embodiment of the MPA 70 includes a pair of bars 90, it is contemplated that other embodiments may exclude or include any number of bars and that such bars are positioned and/or designed such that they do not impede the rotation of the auger.

With reference to FIGS. 6A and 6B, in this exemplary embodiment of the MPA 70, the spikes 84 form an angle with the axle 82 that is less than ninety degrees. Variations may be made in the angle between the spikes 84 and the axle 82, the tightness of the helical pattern formed by the spikes 84, and the overall number of spikes 84 extending from the axle 82, depending on the properties of the material being processed by the MPA 70 and the period of time it is desired that the material remain within the MPA 70.

As described above, the infeed assembly 30 of the present invention may be used to continuously transfer material into a vessel held at an elevated pressure and/or temperature, e.g., when the exemplary infeed assembly 30 is associated with the exemplary MPA 70, when the gate construction 36 is in the open position, the pipe sleeve 34 is in fluid communication with the vessel 74 of the MPA 70, allowing material to flow from the infeed assembly 30 to the vessel 74. In this regard, when the gate construction infeed assembly To continuously transfer material from such a vessel, the outfeed assembly 92 of the present invention may be used and will now be described. The outfeed assembly 92 of the present invention may be operationally connected with the MPA 70, as depicted in FIG. 1, however, it need not be used with the MPA 70. Indeed, it may be used with a traditional hydrolyzer, a vessel held at elevated pressures and/or temperatures, or various processing apparatus, without departing from the spirit and scope of the present invention.

Figure 7A:
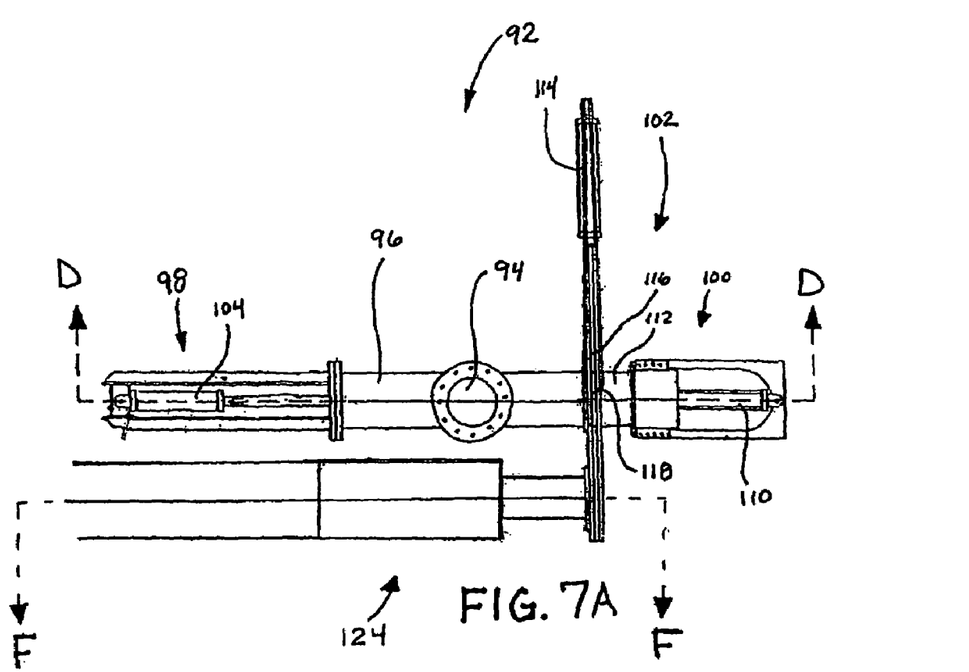
FIG. 7A is a top view of the outfeed assembly of FIG. 1.
Figure 7B:
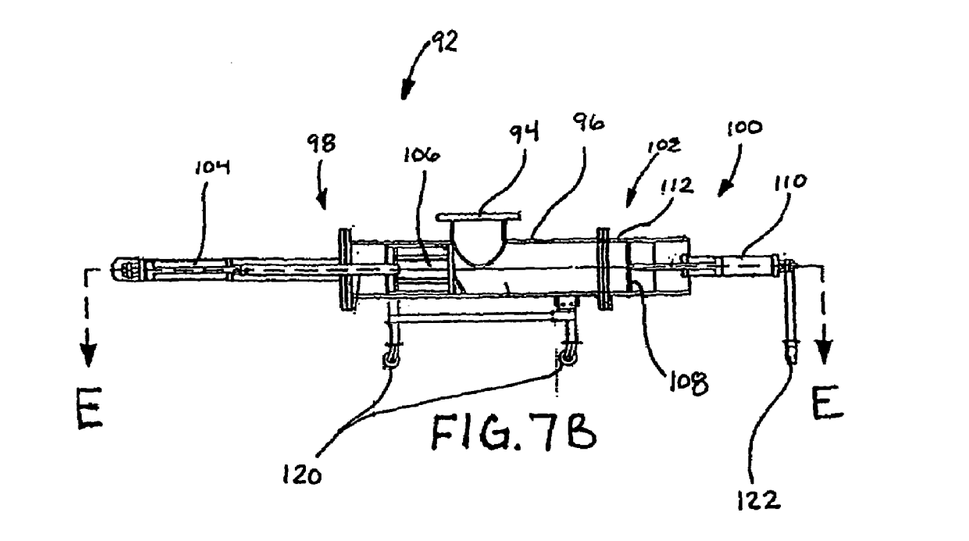
FIG. 7B is a cross sectioned side view of the outfeed assembly of FIG. 7A, as seen from longitudinal cross-section line D-D of FIG. 7A.

An exemplary embodiment of the outfeed assembly 92 is shown operationally connected to the MPA 70 in FIG. 1 and is further depicted in FIGS. 7A through 10. With reference first to FIGS. 7A and 7B, the illustrated embodiment of the outfeed assembly 92 comprises an inlet 94; a compaction chamber 96, which may be held at an elevated pressure and/or temperature, the pressure and/or heat being received, for example, from an operationally connected MPA 70; a plunger assembly 98; a containment assembly 100; and a cutter assembly 102. The outfeed assembly 92 receives product, for example, from the MPA 70, which may be operationally connected to the outfeed assembly 92 at the inlet 94. The received product falls through the inlet 94 and into the compaction chamber 96, where it is compressed by the plunger assembly 98.

The plunger assembly 98 includes a hydraulic cylinder 104 for operating the movement of a ram 106. The ram 106 is situated and cycles within the compaction chamber 96 to compress the product. The force of the ram 106 on the product is sufficient to produce a compressed block 107, shown in FIGS. 8A through 8H, within a volume defined by the compaction chamber 96. It will be understood by those skilled in the art that the term block may be used interchangeably with terms such as plugs and pig to mean a portion of compressed product, and not as a limitation to any particular shape or configuration.

Referring again to FIGS. 7A and 7B, a stop plate 108 is a structural element of the containment assembly 100, which further includes a containment cylinder 110. The cylinder 110 is attached at one end to the stop plate 108. The stop plate 108 serves as a backstop for the ram 106 of the plunger assembly 98, enabling the product interpositioned between the ram 106 and the stop plate 108 to form a compressed block 107.

With reference to FIGS. 7A, 7B, 9B and 9D, the block cutter assembly 102 includes a block forming section 112 and a hydraulic cylinder 114 for operating a knife 116. The knife 116 includes an aperture 118 configured to be aligned with the compaction chamber 96 such that the block forming section 112 and the compaction chamber 96 are in fluid communication allowing the block 107 to pass through the aperture 118 into the block forming section 112 before being cut by the knife 116.

Wheeled carriage assemblies 120, 122 may be provided to enable the outfeed assembly 92 to be supported and mobile. It is contemplated and will be understood by those skilled in the art that all the component assemblies described herein may be supported by carriage assemblies, such as those shown, or motorized platforms to enable portability of individual assemblies or an entire system.

Figures 8A, 8B:
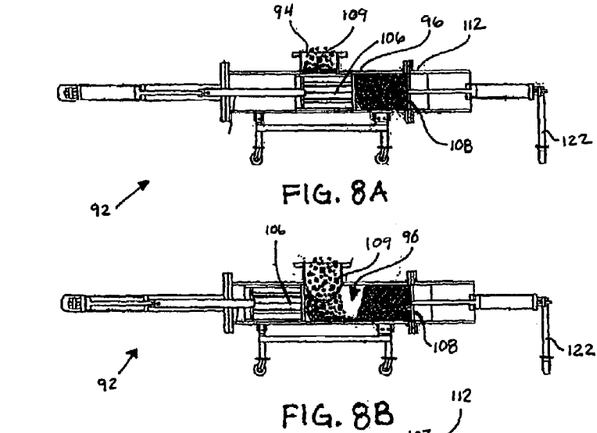
FIGS. 8A through 8H are various operational views of the outfeed assembly of FIGS. 7A and 7B.
Figures 8C, 8D, 8G, 8H:
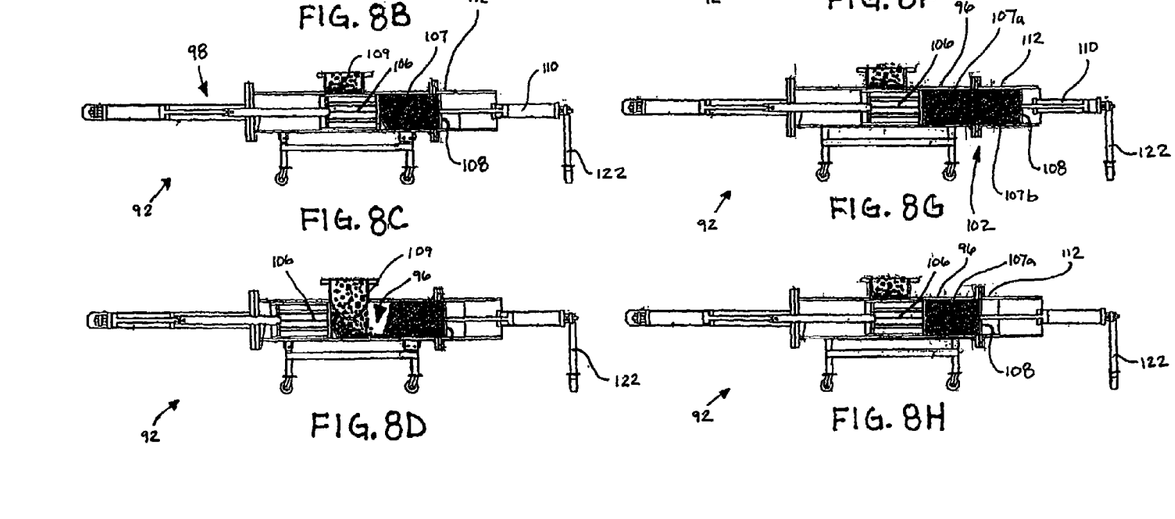

The manner in which the illustrated embodiment of the outfeed assembly 92 operates will now be discussed with reference to FIGS. 8A through 8H, and then with reference to FIGS. 9A through 9D. Referring first to FIG. 8A, the ram 106 is extended to a position which blocks the flow of product 109 from the inlet 94 into the compaction chamber 96 and the stop plate 108 is positioned adjacent the compaction chamber 96 at the opening to the block forming section 112. Turning to FIG. 8B, the ram 106 is withdrawn to allow product 109 to fall into the compaction chamber 96. As shown in FIG. 8C, the ram 106 is extended to compress product 109 against the stop plate 108. Because plunger assembly 98 exerts more force than cylinder 110, cylinder 110 begins to be overridden by the block of product 107 pushing against the stop plate 108, such that the stop plate 108 is forced to retreat slightly into the block forming section 112.

Turning now to FIG. 8D, the ram 106 is shown withdrawn, allowing additional product 109 to be introduced into the compaction chamber 96. Referring to FIG. 8E, the ram 106 is again extended, forcing the newly added product 109 against the block 107. The force of the ram 106 against the block 107 pushes stop plate 108 further into the block forming section 112.

Figures 8E, 8F:
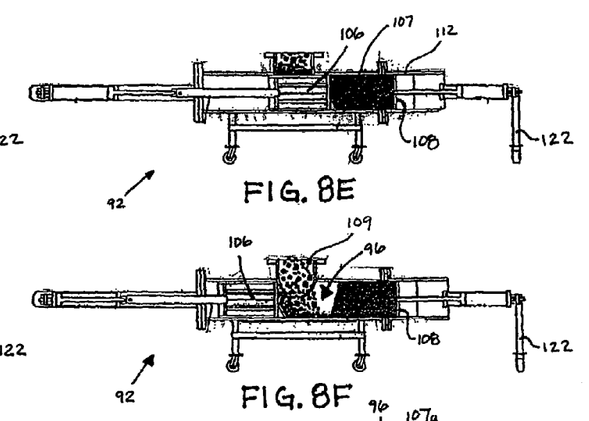
Figure 9A:
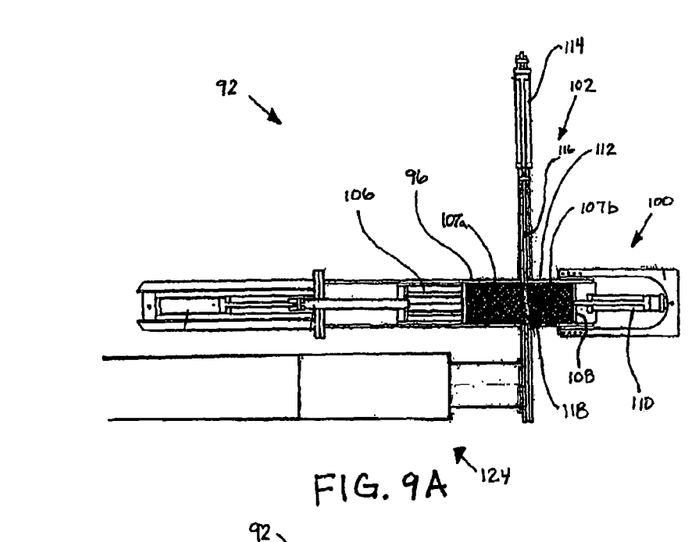
FIGS. 9A, 9C, 9E, and 9F are various operational views of the outfeed assembly of FIGS. 7A and 7B, as seen from longitudinal cross-section line E-E of FIG. 7B.
Figure 9B:
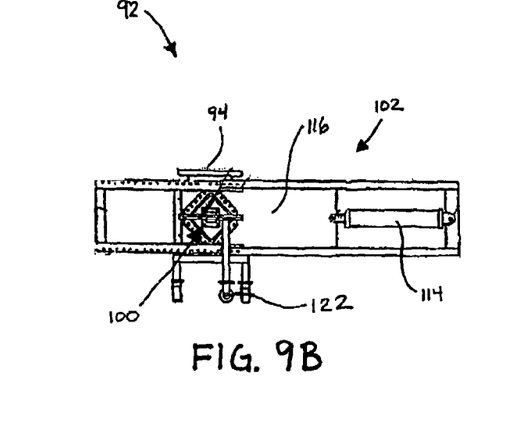
FIGS. 9B and 9D are end views of the outfeed assembly of FIGS. 7A and 7B.
Figure 9C:
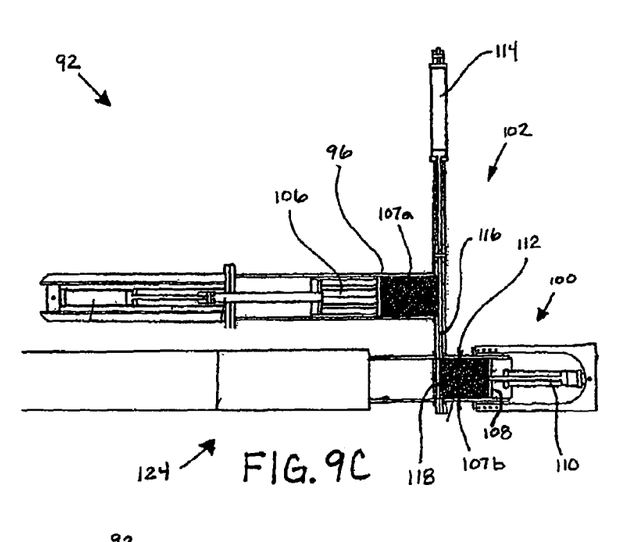
Figure 9D:
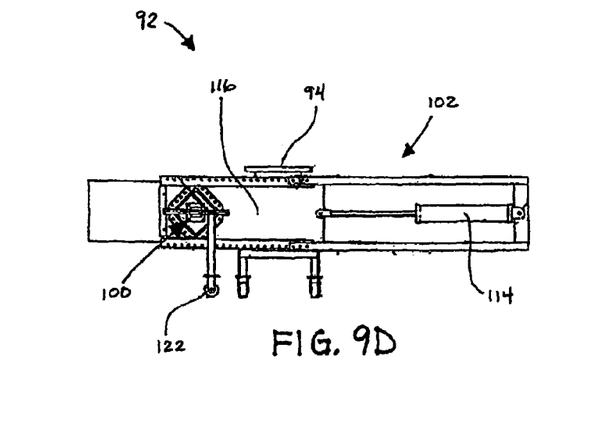

The ram 106 is again withdrawn, as shown in FIG. 8F, allowing still more product 109 to be introduced into the compaction chamber 96. The ram 106 is again extended, as shown in FIG. 8G, forcing the newly added product 109 against the block 107. The operation of introducing product 109 into the compaction chamber 96 and forcing the newly added product 109 against the compacted block of product 107 to form a larger block of product 107 continues until the capacity of the block forming section 112 is met, that is, the stop plate 108 has fully retreated into the block forming section 112 and the cylinder 110 has been completely overridden, as shown in FIG. 8G and 9A.

Then, the block cutting assembly 102 is used to cut a portion of the block 107b held within the block forming section 112, leaving a portion of the block 107a within the chamber 96. In this regard, with reference to FIGS. 9A through 9D, the cylinder 114 of the block cutting assembly 102 operates to extend the knife 116 and cut the block 107. As the knife 116 extends to cut the block 107, the block cutting assembly 102 moves on the wheeled carriage assembly 122 from a position where the aperture 118 is aligned with the chamber 96, shown in FIGS. 9A and 9B, to a position where the aperture 118 is not aligned with the chamber 96, shown in FIGS. 9C and 9D.

Figure 9E:
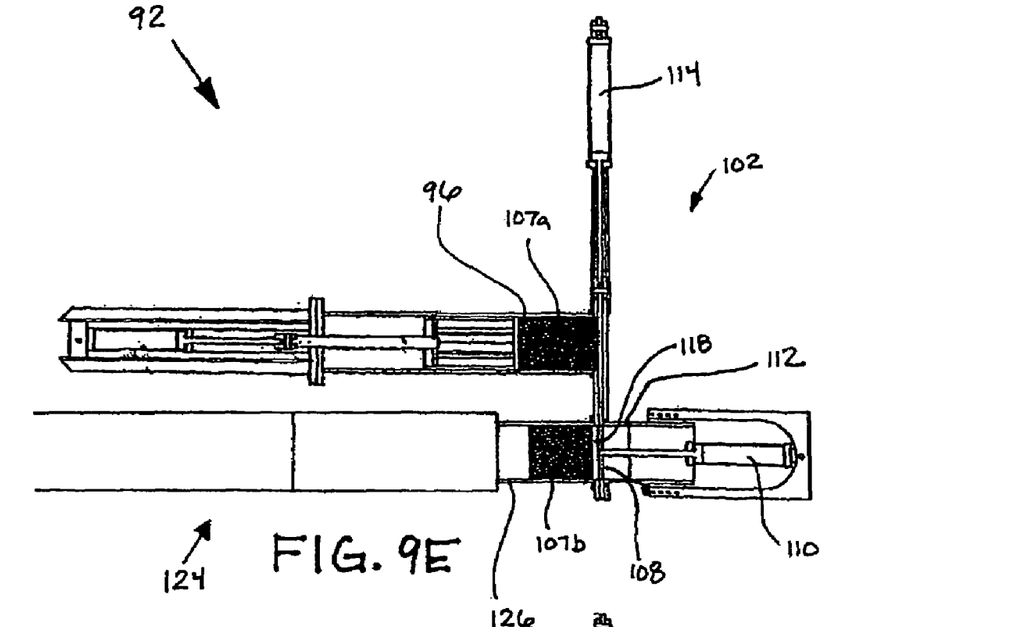
Figure 9F:
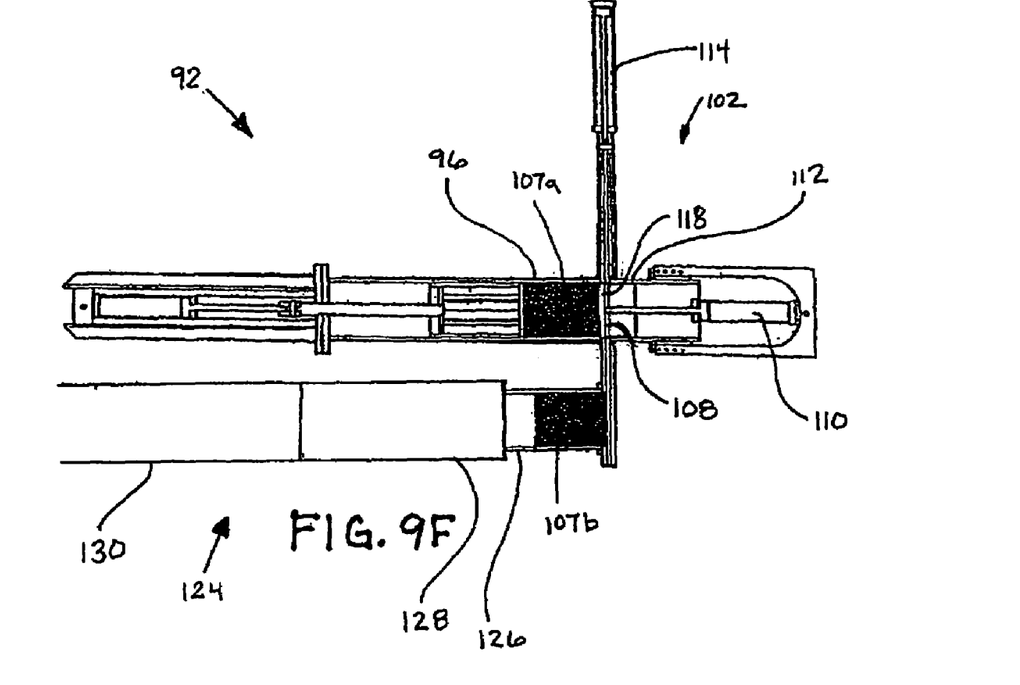
Figure 10:
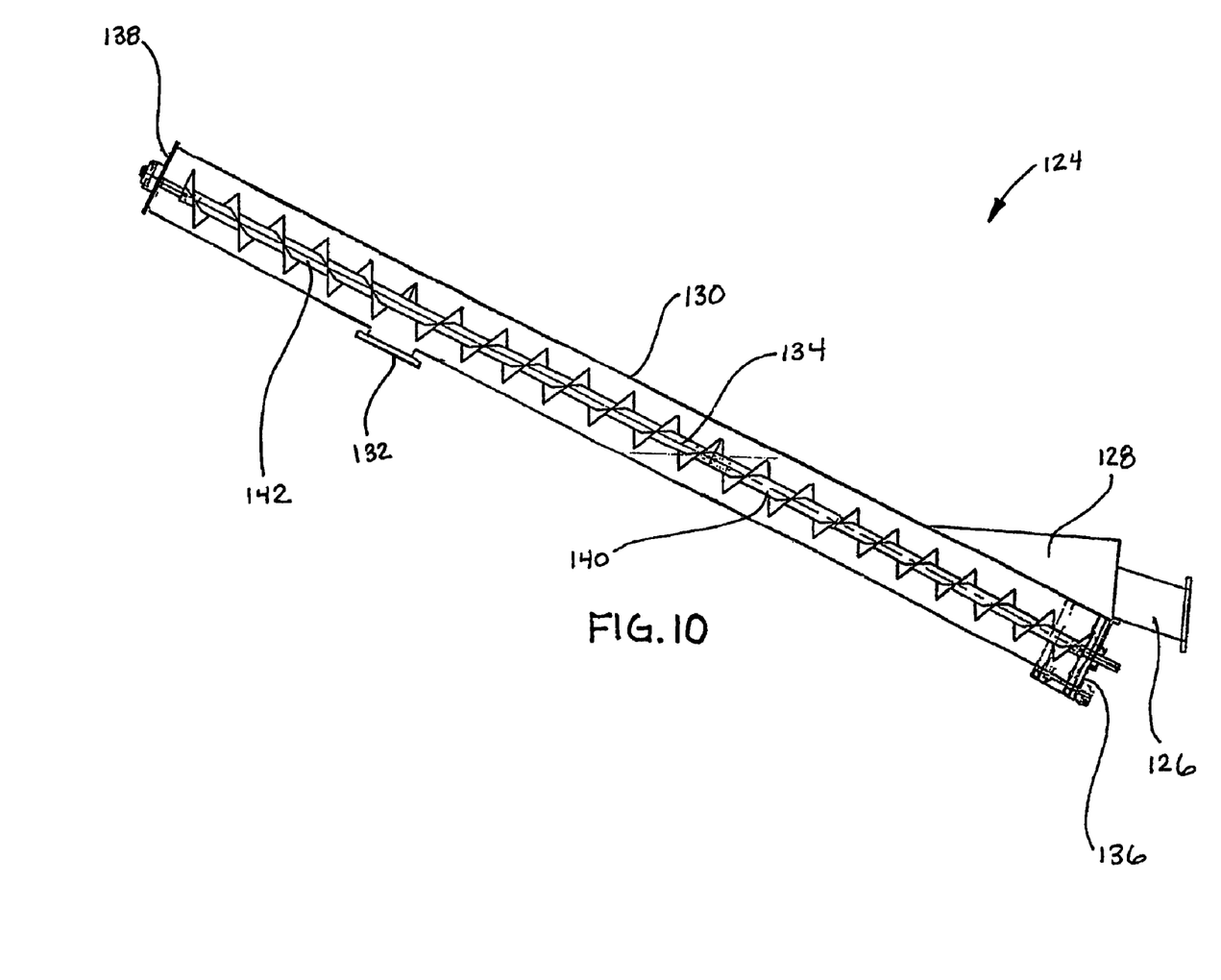
FIG. 10 is a side view of the material exit apparatus of the outfeed assembly of FIGS. 7A and 7B, as seen from longitudinal cross-section line F-F of FIG. 7A.

In this regard, the outfeed assembly 92 may also include a material exit apparatus 124. With reference to FIGS. 9E, 9F and 10, an exemplary embodiment of the material exit apparatus 124 includes an ejection tube 126, to which the aperture 118 becomes aligned; an expansion chamber 128; an exit channel 130, in fluid communication with the expansion chamber 128; and an outlet 132. With reference to FIG. 9E, the cylinder 110 may operate to extend the stop plate 108, forcing the freshly cut block 107b from the block forming section 112, into the ejection tube 126 and associated expansion chamber 128. The ejection tube 126 and the expansion chamber 128 may not be required if the block 107 is of low temperature and pressure; the freshly cut block 107b could simply be expelled from the block forming section 112. In either event, with reference to FIGS. 8H and 9F, the block forming section 112 of the block cutting assembly 102 is shown realigned with the chamber 96 ready to cooperatively execute the above-described operation.

Generally, there are various adverse effects associated with transferring product from a vessel held at an elevated pressure and/or temperature to a vessel held at ambient pressure and/or temperature. For example, upon exposure to ambient pressure a forceful or violent ejection of product from the area of elevated pressure could occur. For another example, loss of pressure and/or heat from the area of elevated pressure and/or temperature could occur. However, in the outfeed assembly 92, the block 107 is compacted and fills the portion of the block forming section 112 into which it moves and the movement of the block 107 from the compaction chamber 96 to the block forming section 112 takes place in gradual steps until the cylinder 110 has been overridden.

At this time, referring again to FIGS. 8G and 9A, the space defined by the ram 106, the compaction chamber 96, the block forming section 112, and the stop plate 108 is substantially consumed by the block 107. With reference again to FIG. 9C, when the portion of the block 107b is moved to an area of ambient pressure and/or temperature, a portion of the compressed block 107a remains within the compaction chamber 96, consuming the space defined by the ram 106, the compaction chamber 96, and the knife 116, a space which remains consumed until the block forming section 112 and the stop plate 108 are realigned with the compaction chamber 96, as shown in FIG. 8H. This consumption of space leading from the area of elevated pressure and/or temperature to the area of ambient pressure and/or temperature during the movement of material from the latter area to the former area substantially eliminates the escape of pressure and/or heat from the compaction chamber 96, thereby maintaining the elevated pressure and/or temperature within the compaction chamber 96 and avoiding forceful or violent ejection of the block 107 from the outfeed assembly 92 upon exposure to the ambient pressure.

Once the block 107b is forced into the ejection tube 126 and the associated expansion chamber 128 of the material exit apparatus 124, it falls into the exit channel 130. With reference to FIG. 10, contained within the channel 130 is a rotating auger 134 for breaking up the block 107b (shown in FIG. 9F) and delivering it to the outlet 132. The auger 134 extends from a first end 136 of the channel 130 adjacent the expansion chamber 128 to a second end 138 of the channel 130. The outlet 132 is positioned on the underside of the channel 130 between the first end 136 and the second end 138. In this regard, the helical pattern of the auger 134 winds in a first direction along the length of a first portion 140, which extends from the first end 136 of the channel 130 to the outlet 132, while the helical pattern of the auger 134 winds in a second direction along the length of a second portion 142, which extends from the second end 138 of the channel 130 to the outlet 132. This helical pattern allows the rotating auger 134 to deliver processed product within the channel 130 to the outlet 132. Upon leaving the material exit apparatus 124, the processed product may be used for various applications, or may be subjected to further treatments before being used.

In the forgoing manner, an exemplary system and method of the present invention may be used to transform solid waste into useful material. The system 10 includes the infeed assembly 30, the MPA 70, the outfeed assembly 92, and the material exit apparatus 124; however, these discrete components of the exemplary system 10 may also be used separately to process material without departing from the spirit and scope of the present invention.

It will be obvious to those skilled in the art that further modifications may be made to the embodiments described herein without departing from the spirit and scope of the present invention.

The invention claimed is:

1. An outfeed assembly, comprising:
   a compaction chamber adapted for being held at non-ambient pressures and/or temperatures and having an inlet for receiving material;
   a ram movable within said compaction chamber, for compacting the material;
   a cutter assembly for cutting a block from the compacted material, wherein said outfeed assembly allows material to be continuously transferred from an environment having a non-ambient pressure and/or temperature to an environment having an ambient pressure and/or temperature; and
   a material exit apparatus, comprising:
      an exit channel having an inlet, through which material may enter said channel, and an outlet, through which material may exit said channel; and
      a rotating auger contained within said channel for urging the material from the inlet of said channel to the outlet of said channel.

2. The outfeed assembly of claim 1, wherein said cutter assembly comprises:
   a block forming section for receiving the compacted material from said compaction chamber; and
   a knife for cutting the block from the compacted material.

3. The outfeed assembly of claim 1, and further comprising a stop plate, serving as a backstop for the ram and being positioned at an opening to said block forming section.

4. The outfeed assembly of claim 1, and further comprising a stop plate and a cylinder attached at one end to said stop plate and controlling the movement of said stop plate within said block forming section.

5. The outfeed assembly of claim 1, and further comprising an expansion chamber, for receiving compacted material subjected to non-ambient pressure and/or temperature, said chamber being in fluid communication with said exit channel.

6. The outfeed assembly of claim 1, wherein said auger has a helical pattern.

7. The outfeed assembly of claim 6, wherein said the helical pattern of a first portion of said auger winds in a first direction and the helical pattern of a second portion of said auger winds in a second direction.

8. A system for processing material, comprising:
   a sleeve having an inlet for receiving material;
   a first ram, movable within said sleeve, for compressing the material;
   a gate construction, movable between an open position and a closed position;
   a compaction chamber adapted for being held at non-ambient pressures and/or temperatures and being in fluid communication with said sleeve when said gate construction is in the open position;
   a second ram, movable within said compaction chamber, for compacting the material;
   a block forming section in fluid communication with said compaction chamber, for receiving the compacted material from said compaction chamber, said block forming section movable to allow the material to be transferred from a non-ambient pressure and/or temperature to an ambient pressure and/or temperature;
   a cutter assembly for cutting a block from the compacted material;
   a vessel adapted for being held at non-ambient pressures and/or temperatures and having an inlet, through which material may enter said vessel, and an outlet, through which material may exit said vessel; and
   a first auger, contained within said vessel, for urging material from the inlet of said vessel to the outlet of said vessel;
   wherein said vessel is in fluid communication with said sleeve when said gate construction is in the open position.

9. The system of claim 8, and further comprising a processing chamber adapted for being held at non-ambient pressures and/or temperatures, said processing chamber being interpositioned between said sleeve and said compaction chamber, wherein said processing chamber is in fluid communication with said sleeve when said gate construction is in the open position.

10. The system of claim 8, and further comprising a thrust bearing supporting an end of said first auger for absorbing force transferred from said first ram.

11. The system of claim 8, and further comprising:
   an exit channel, said channel having an inlet, for receiving compacted material from said block forming section, and
   an outlet, through which material may exit said channel; and a second auger contained within said channel for urging the material from the inlet of said channel to the outlet of said channel.

12. The system of claim 11, and further comprising:
   a vessel adapted for being held at non-ambient pressures and/or temperatures and having an inlet, through which material may enter said vessel, and an outlet, through which material may exit said vessel; and
   a first auger, contained within said vessel, for urging material from the inlet of said vessel to the outlet of said vessel;
   wherein said vessel is in fluid communication with said sleeve when said gate construction is in the open position.

* * * * *